United States Patent [15] 3,691,522
Hocking et al. [45] Sept. 12, 1972

[54] EARLY WARNING BRAKE FAULT SYSTEM

[72] Inventors: Loren P. Hocking, East Detroit, Mich. 48021; Louis B. Lotti, Clair Shores, Mich. 48081

[73] Assignee: Benjamin W. Colman, Southfield, Mich. part interest

[22] Filed: June 7, 1971

[21] Appl. No.: 150,522

[52] U.S. Cl. ............... 340/52 C, 340/59, 200/84
[51] Int. Cl. ............................................. B60q 1/00
[58] Field of Search ....... 340/52, 52 B, 52 C, 59, 244; 200/83, 84; 73/308, 313

[56] References Cited

UNITED STATES PATENTS

| | | | |
|---|---|---|---|
| 3,450,853 | 6/1969 | Snyder | 340/52 C X |
| 3,560,818 | 2/1971 | Lewis et al. | 340/52 C |
| 3,603,925 | 9/1971 | Hughes et al. | 340/59 |

Primary Examiner—Alvin H. Waring
Attorney—Benjamin W. Colman

[57] ABSTRACT

An early warning system, in a motor vehicle having a hydraulic brake system, to signal potential brake failure due either to a loss or leakage of brake fluid from the brake system, or to excessive wear of lining on the brake shoes or disc pads at the wheels is disclosed. The loss of measured as a volume loss of brake fluid.

24 Claims, 11 Drawing Figures

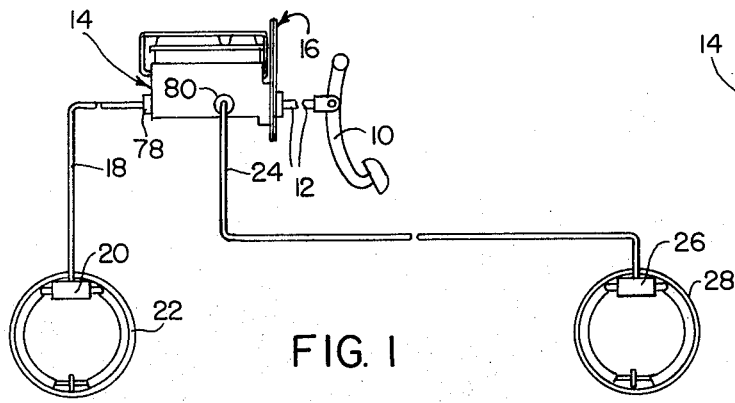
FIG. 1
FIG. 1A
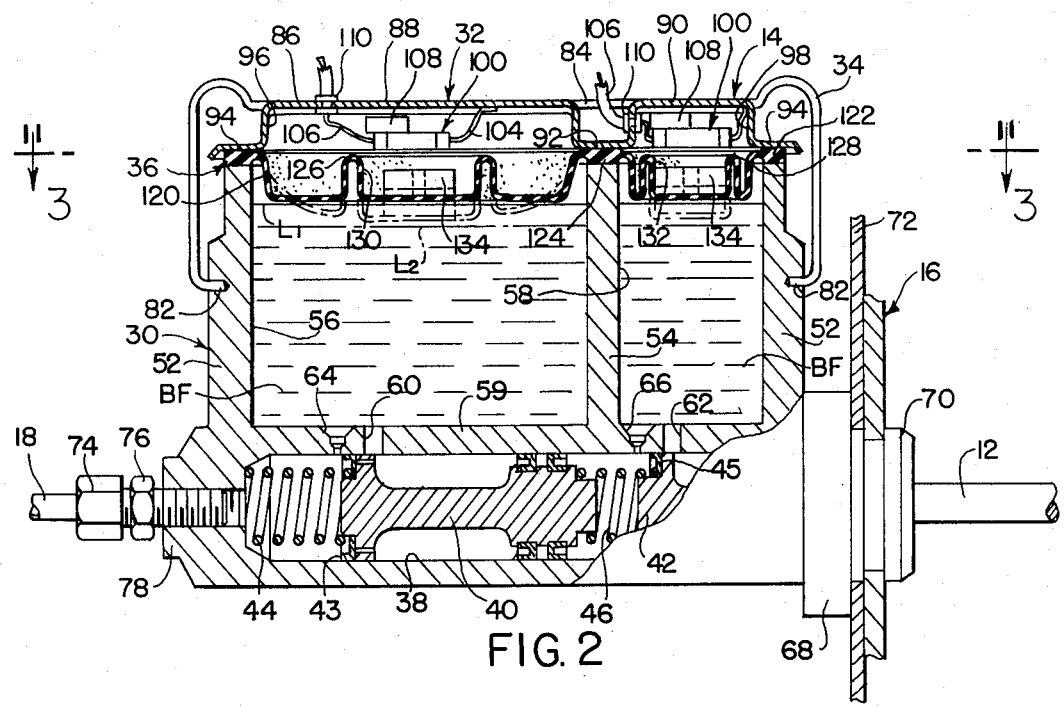
FIG. 2
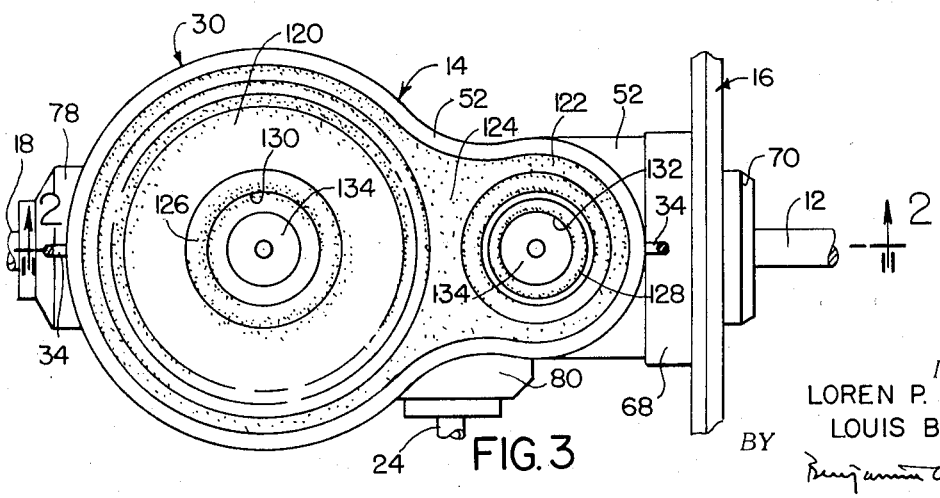
FIG. 3
INVENTORS
LOREN P. HOCKING &
LOUIS B. LOTTI
BY Benjamin W. Colman
ATTORNEY

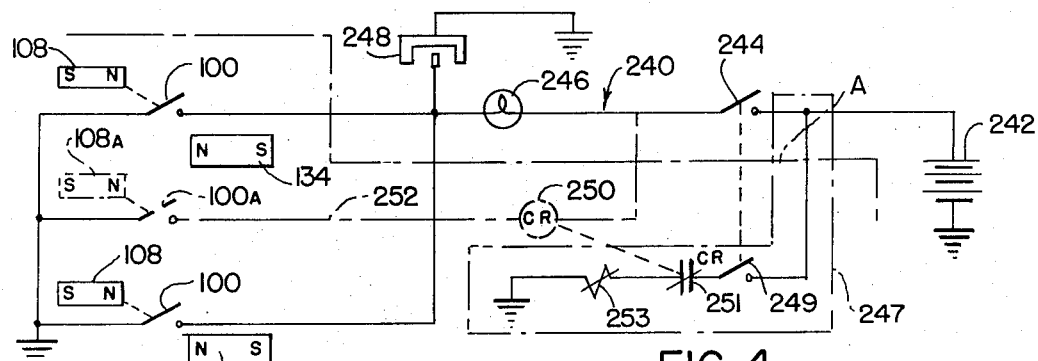
FIG. 4
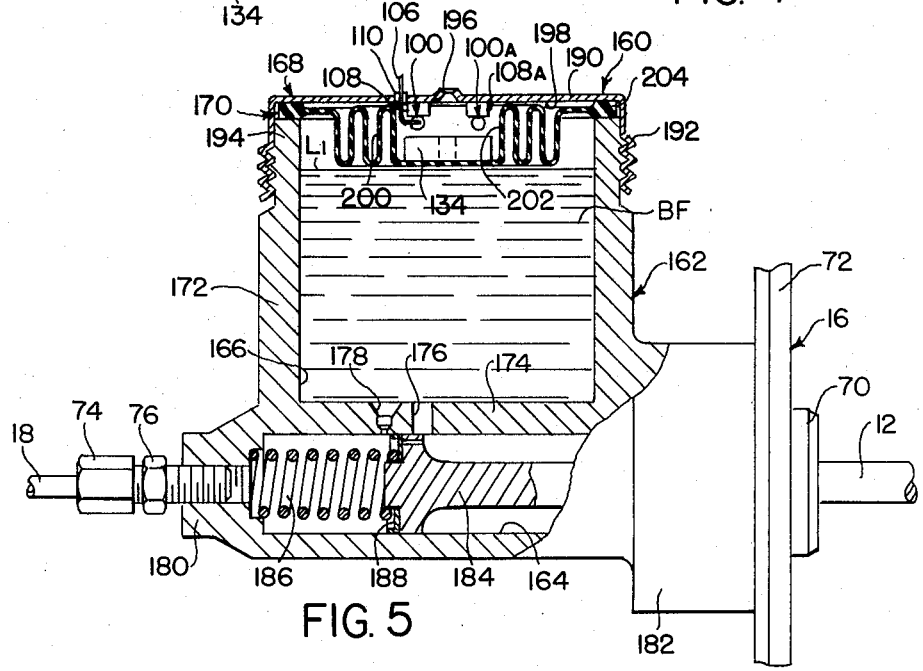
FIG. 5
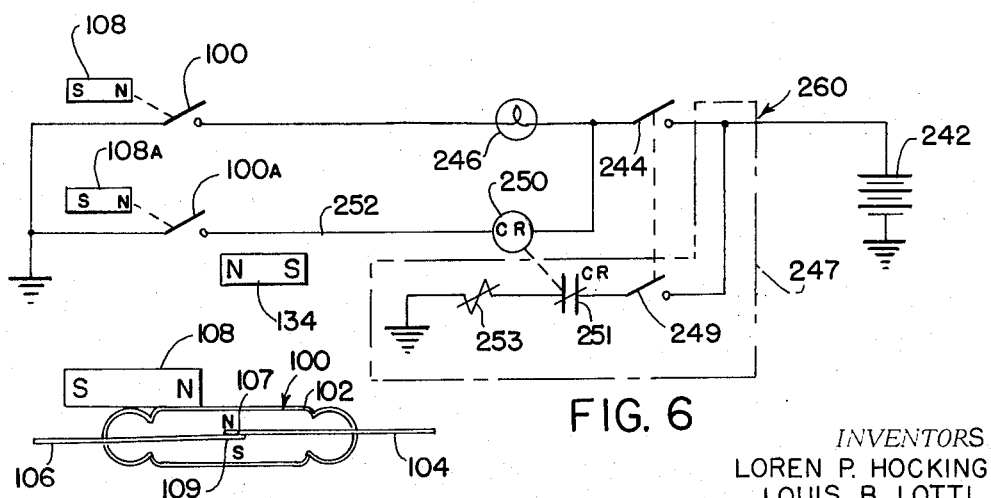
FIG. 6
FIG. 7
INVENTORS
LOREN P. HOCKING &
LOUIS B. LOTTI
BY Benjamin W Colman
ATTORNEY

*INVENTORS*
LOREN P. HOCKING &
LOUIS B. LOTTI

BY

ATTORNEY

EARLY WARNING BRAKE FAULT SYSTEM

One preferred embodiment of the invention relates to a signalling device and system utilizing the vehicle brake signal light and the master brake cylinder currently in use, the cover for the master brake cylinder housing being slightly modified, the device including a flexible diaphragm between the master cylinder housing and its cover, a magnetically biased reed switch secured in the cover and a control magnet disposed in the diaphragm to coercively effect or not effect the function of the reed switch.

The early warning signalling of brake cylinder fluid loss in the system of this invention achieves two important goals. First, the vehicle operator is warned either that an undue volume of brake fluid has leaked out of the brake system, or secondly, that the linings on the brake shoes or disc pads are worn down to a dangerously low measure. Both of these conditions will produce decrease in the volume of brake fluid in the master cylinder reservoir. Therefore, a signalling device and system directly responsive to such volume loss will provide the vehicle operator with a warning before brake failure actually occurs.

In currently designed and available brake failure warning system, the brake signal light in the driver compartment of the vehicle is adapted to be energized if and only if the brake fluid in the master cylinder unit and/or the brake system has been substantially completely lost, and the vehicle operator is depressing the brake pedal to apply pressure to the brake fluid. Of course, in such condition, the vehicle is without braking power and the operator can no longer control deceleration of the vehicle. A signal light at this point provides the operator with no protection, and the warning system is wholly inadequate to the purpose for which it was designed.

The invention disclosed in this application provides an early warning brake fault device and system that signals a relatively small amount of brake fluid volume loss, long before there could be an ultimate failure of braking power. The invention further provides a relatively simple, low cost and minor modification of the master brake cylinder structure which forms a part of the warning and signalling system. A further object of the invention is the provision of magnetic elements mounted upon a flexible diaphragm within the master cylinder that are responsive in movement to any level change in the volume of brake fluid in the master cylinder reservoir(s), whereby the coercive effect of the magnetic elements is increased or diminished on a switch secured within the master cylinder cover to open or close the brake signalling circuit. Yet another object of the invention is the provision of switching elements within the cover and above the brake fluid in the master cylinder. A further object is to utilize the electric power, brake signalling lamp, and at least a portion of the circuitry currently installed in motor driven vehicles, whereby the overall cost of the inventive system is substantially decreased, requiring only slight modification of the present master cylinder cover and brake signalling circuit.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a generally diagrammatic outline or illustration of our improved motor vehicle brake system operated with hydraulic fluid, embodying the invention.

FIG. 1A is a fragmentary diagrammatic outline or illustration of a modified portion of the brake pedal linkage to the master cylinder device including a power assist unit.

FIG. 2 is an illustration of a duplex master brake cylinder, substantially in vertical longitudinal section, taken substantially along the line 2—2 of FIG. 3.

FIG. 3 is a horizontal substantially plan view taken substantially on the line 3—3 of FIG. 2.

FIG. 4 is a schematic wiring diagram of electrical circuitry employed with the duplex master cylinder device illustrated in FIGS. 2 and 3.

FIG. 5 is a vertical sectional view, partially in elevation, of a single unit master brake cylinder device, substantially similar to the illustration in FIG. 2.

FIG. 6 is a schematic wiring diagram of electrical circuitry employed with the master brake cylinder device illustrated in FIG. 5.

FIG. 7 is a side elevational view of a reed switch adapted to be used in the circuitry of the brake signalling system of this invention.

Figure 8:
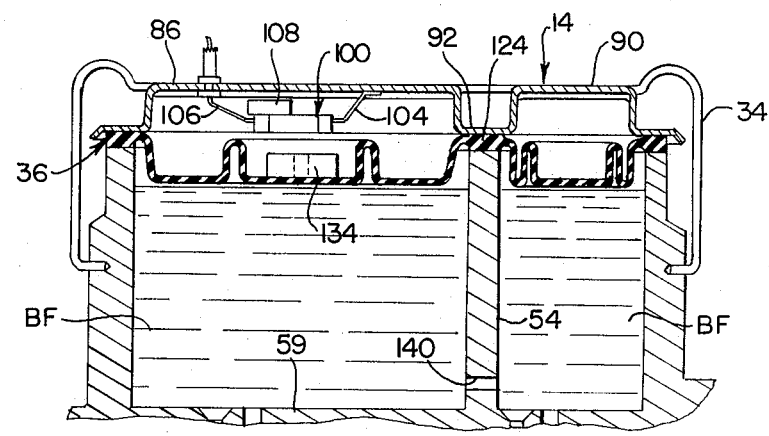
FIG. 8 is a view substantially identical to that in FIG. 2 showing an equalizing passage between the two reservoirs, whereby only a single switch and control magnet are required for the brake fluid in both reservoirs.

Referring particularly to FIG. 1, the brake pedal device 10 is linked or direct connected to the master brake cylinder unit 14 suitably secured and mounted upon the framing 16 of the motor vehicle, for the hydraulic fluid brake system. The master brake cylinder is connected by fluid conduits 18 (though only one is illustrated) to the front brake cylinders 20 in the front brake units 22 and by conduits 24 to the rear brake cylinders 26 in the rear brake units 28.

FIG. 1A illustrates the brake pedal linkage 12 connected to the power assist unit 29 which in turn is operatively connected to the piston in the master brake cylinder, according to currently conventional practice.

The duplex master brake cylinder device 14 (FIGS. 1, 2 and 3) comprises a housing 30, a cover 32, a cover hold-down ring 34, a relatively flexible resilient diaphragm 36 disposed intermediate the housing and cover, a brake fluid cylinder 38 containing pistons 40 and 42, the latter being direct connected to the brake pedal drive link or level 12, seals 43,45, piston biasing springs 44,46 and brake fluid BF.

The master brake cylinder housing 30 comprises a body portion 52 having a medial partition wall 54 dividing the brake fluid chamber into two brake fluid reservoirs 56 and 58, the brake cylinder 38 being disposed below the bottom wall 59 at the lower side of the housing and communicating with the reservoir 56 through the by-pass port 60, the reservoir 58 communicating with cylinder 38 by way of by-pass port 62. Reservoirs 56 and 58 are provided with inlet ports 64 and 66 communicating with the brake cylinder 38. The brake cylinder pistons 40 and 42, the seals 43 and 45, the springs 44 and 46 biasing them, and the brake pedal rod or linkage 12, to the right in FIG. 2, whether direct connected to the foot pedal 10 or to the power assist unit 29, are of currently conventional arrangement and construction and operative in the cylinder 38 in accordance with present day practices.

The master cylinder housing 30 at its boss or hub section 68 is secured by a suitable fitting 70 to a support 16 (FIG. 1) which generally comprises panel materials 72 forward of the brake pedal 10, or to the power assist unit 29 (FIG. 1A) which in turn is mounted upon the support 16. The brake fluid conduits 18 and 24 are secured to the housing body 52 by fitting 74,76 of currently conventional construction at the bosses 78,80 respectively.

The cover 32 overlying the diaphragm 36 and the housing 30 is secured by the retainer clamp ring 34 which has its ends pivotally disposed in the blind holes 82,82 at each longitudinal end of the housing body 52. The wire clamp ring 34 holds the cover 32 compressively upon the diaphragm 36. The cover is suitably grooved longitudinally on its top side to receive an seat the web or mid-portion 84 of the clamp ring 34.

The cover 32 comprises a body 86 having an annular inverted recessed cup portion 88 adapted to overlie the fluid reservoir 56 and a second such cup portion 90 adapted to overlie the fluid reservoir 58 with an intermediate web 92 and a peripheral flange 94 adapted to seat and register upon the edges of the partition wall 54 and the housing body 52 respectively, which lie substantially in a plane. The inverted cup portion 88 provides an interior chamber 96, and the cup portion 90 provides an interior chamber 98, each adapted to contain a magnetically biased reed switch 100.

As seen particularly in FIG. 7, the reed switch 100 comprises an outer incapsulating shell or housing 102, reed conductors 104, 106 having their distal ends or contact points 107 and 109 respectively arranged in overlying relationship and normally spaced apart and open. A biasing magnet 108 is secured to the switch incapsulating housing 102 with its magnetic poles arranged in such a way that the conductor contact points will be biased to either open or close a circuit in which the reed switch 100 is connected. The reed switch disclosed herein is a standard conventional magnetic reed switch normally urged closed by the biasing magnet 108.

One of the conductors, 104, is secured to the cover body 86 by soldering, welding or other suitable means so that the switch is grounded to the cover, and in the adjacent cover cup portion 90, a second reed switch 100 is similarly grounded. The second conductor 106 of each switch is passed through an insulating grommet 110 disposed through the cover body 86 to be connected in the circuitry described hereinbelow. The switch 100 and its biasing magnet 108 are secured within the inverted cup portions 96 and 98, in fixed position.

The diaphragm 36 is an integrally formed unitary member preferably made of a substantially resilient flexible rubber composition or plastic type material and comprises a body portion 120 having having a peripheral bead 122 overlying the top peripheral edge of the housing body 52 with an intermediate web portion 124 adapted to overlie the top edge of the partition wall 54. The diaphragm body is preferably formed with folds arranged in annular upstanding ribs 126 and 128 forming cavities 130 and 132 respectively within which the control magnets 134,134 are seated. These magnets are preferably secured in fixed position with a suitable adhesive to the bottom wall of the cavity 130 and 132 respectively.

The diaphragm 36 is adapted to seal off the brake fluid reservoirs 56 and 58 from the atmosphere which enters through any opening or port and fills the areas under the cap 32 so that atmospheric pressure is always present under the cover 32 and above the diaphragm 36.

The reed switch biasing magnet 108 and the control magnet 134 are preferably made of a sheet or molded rubber composition embodying magnetizable metal particles, arranged in either bar or washer shaped form, or of any other kind or type of permanent magnetic material. To repel each other, like poles should be oriented to or in register with like poles, and to coercively attract each other opposite poles of one magnet should be presented to the other. The reed switch 100 also has its contact members 107 and 109, which are magnetically influenced by both the biasing magnet 108 and the control magnet 134.

The diaphragm 36 is preferably made of any resilient flexible rubber type or plastic composition materials, such for instance as a neoprene rubber base material, which are substantially impervious to chemical decomposition by the brake fluids normally used in motor vehicle brake systems.

To maintain the reed switch 100 in open position, when it is being influenced to its normally closed contact position by the biasing magnet 108, the magnetic factors should be aligned as follows. Like polarities of the control magnet 134 and the switch contact 107 should be disposed in relatively close arrangement under the cover 32. Similarly, as illustrated in FIG. 7, like polarities of the biasing magnet 108 and the switch contact 107 should be arranged and oriented to each other at a distance such that upon a predetermined lowering or settling of the control magnet 134, the latter's repelling effect upon the switch contact 107 will be less than the repelling-attracting effect of the biasing magnet 108 to close the contacts 107 and 109.

As brake pressure is applied by the brake pedal 10, brake fluid is forced into the conduits 18 and 24 to the brake cylinders 20 and 26. If leakage has occurred, the level of brake fluid drops appreciably when the brake pedal is released. At that point, the diaphragm body 120, under atmospheric pressure, follows the level of such fluid, carrying the control magnets 134,134 to level $L_2$ or below. When the predetermined brake fluid level $L_2$ is reached by the diaphragm, the repelling effect of the control magnet 134 upon the field effect of the biasing magnet 108 is substantially reduced. At that point, the repelling-attracting effect of the biasing magnet 108 closes the switch contacts 107 and 109.

The repelling and coercive values and characteristics of the magnetic elements can and should be selected to satisfy the physical limitations of the space forms of the master cylinder housings, reservoirs and covers, and the distance relationships of the biasing magnet 108, the switch contacts 107 and 109, and the control magnet 134.

Figure 10:
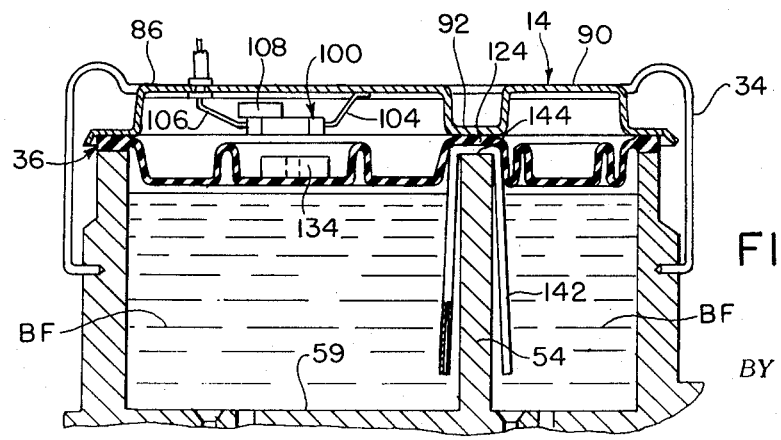
FIG. 10 is a view similar to that shown in FIG. 8 with a brake fluid equalizing balancing siphon tube.

The duplex master cylinder unit 14 can be modified as illustrated in FIGS. 8 and 10 so that the brake fluid in both reservoirs 56 and 58 is maintained substantially at the same level, by an equalizing passageway 140 through partition all 54 (FIG. 8), or by the equalizing siphon tube 142 overlying the partition wall edge 144 under the diaphragm portion 124 (FIG. 10). In such modifications, only a single reed switch 100 and control magnet 134 in one of the reservoirs are required since the fluid level is the same in both reservoirs, thus reducing the overall cost of the inventive device.

The single unit master brake cylinder device 160, illustrated substantially in vertical sectional view in FIG. 5, is very similar to the duplex cylinder device 14 and comprises the housing 162, the brake cylinder 164, the brake fluid reservoir 166, the closure cover 168, the flexible resilient diaphragm 170, a pair of reed switches 100 and 100a with their biasing magnets 108 and 108a respectively, and brake fluid BF.

The housing 162 comprises the body 172 having a bottom wall 174 through which the by-pass port or passage 176 allows brake fluid to enter from the reservoir 166 into the cylinder 164, with a brake fluid inlet port 178 through the bottom wall, a boss 180 to which the brake fluid conduits 18 are connected by fittings 74,76, as to the duplex master cylinder 14, a mounting flange or hub 182 adapted to be secured to the support 16 (or to the power assist unit 29) by the fastener member 70, a master brake cylinder piston 184 biased by a spring 186, and the seal 188, all of currently conventional construction.

The cover 168 is provided with a body 190 formed as a cup with a peripheral threaded flange 192 adapted to screw or thread onto the upper extension 194 of the housing body 172. The cover body 190 is provided with a port 196 for admission of air to the chamber 198 intermediate the cover 168 and the diaphragm 170 within which the reed switches 100 and 100a and their biasing magnets 108 and 108a respectively, and control magnet 134 are disposed and arranged in magnetic orientation as above described for the master cylinder unit 14.

The diaphragm 170 is made of material substantially identical or similar to that of which the diaphragm 36 is made and as an integral unit, and is provided with one or more annular corrugations or ribs 200 providing a central cavity 202 adapted to seat and within which the control magnet 134 is disposed. The diaphragm 170 is further provided with a peripheral bead or edge portion 204 adapted to rest upon and seal the distal edge of the housing extension 194 under the cover 168.

Figure 9:
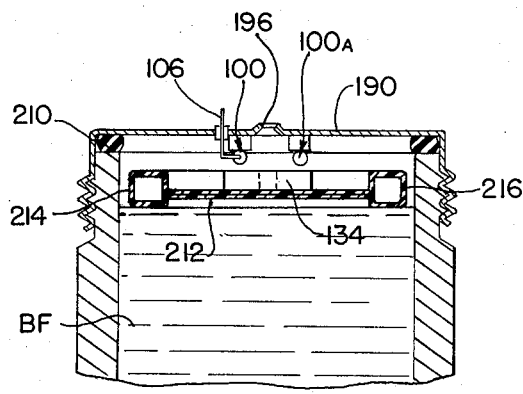
FIG. 9 is a view substantially similar to that illustrated in FIG. 5 showing a float riding freely upon the brake fluid in the reservoir as the support means for the control magnet.

Although the flexible diaphragm 36 or 170 is currently in use with master brake cylinder devices, as described and illustrated, an alternate construction may be used. Such modification is illustrated in FIG. 9, wherein a ring seal 210 is provided under the cover body 190 upon the distal edge of the housing extension 194, and the control magnet 134 is disposed and adhesively secured upon the central portion or body 212 of the float 214 which rides directly upon the brake fluid BF in the reservoir. The float 214 rides upon the brake fluid whether the atmosphere is admitted through port 196 to the chamber thereunder or is closed off therefrom. To avoid cocking or tilting and jamming of the float, its outer lateral edges 216 are preferably flat and substantially parallel to the inner side wall surfaces of the reservoir. Although a generally doughnut-shaped air float 214 is illustrated and described, any other type of operative float may be used that provides support for the control magnet 134 in its required orientation to the switch 100 and biasing magnet 108.

A differential pressure switch is currently used and required in duplex vehicle brake systems. It functions as a signalling device for the presence or absence of brake fluid pressure in the brake system when the brake pedal is applied. The currently used brake signal system depends primarily upon brake pressure being present in the brake lines. The instant invention embodies the concept of a warning system based solely upon the brake fluid level in the master cylinder reservoir, an entirely different bases for signalling brake fluid loss or brake lining wear, Thus, a differential switch forms no part of the inventive device or system, and may be continued in use or eliminated, as desired. If continued in use, its function will not impair or affect the operation of the inventive device or system hereindisclosed.

Circuitry 240 for the inventive system utilizing the duplex master cylinder device 14 is schematically illustrated in FIG. 4. Power is supplied by the motor vehicle battery 242 through the ignition switch 244 to a brake signal lamp 246 and a differential switch 248, all of conventional construction and presently in use in master cylinder brake fluid signalling systems. This portion of the circuitry is schematically illustrated to the right of and above the broken line A in FIG. 4. What has been added to this circuit by the inventive device and system hereindisclosed are the reed switches 100 with their attached biasing magnets 108 connected in parallel, as illustrated in FIG. 4. Each switch is independently operable and responsive to movement of the control magnets 134 disposed adjacent thereto in the wells or cavities 130 and 132 of the diaphragm 36. As will be seen in the schematic wiring diagram of FIG. 4, the reed switches 100 are held open by the repulsive effect of like poles of the control magnets within the magnetic field of influence about the reed switch contacts 107.

Optionally, a third reed switch 100a and its biasing magnet 108a are connected to a control relay 250 to the conductor 252 to the signal light 246 and the ignition switch 244. This third switch 100a is arranged, under the influence of the control magnet 134 and control relay 250, to close after the reed switches 100 have closed the circuit to the brake signal lamp 246.

If brake fluid volume loss has closed both circuits through switches 100 and 100a, control relay 250 is energized and the optional secondary circuit 247, if connected, comes into play. The starter switch 249, linked to ignition switch 244, is rendered inoperative when the normally closed contacts 251 of control relay 250 open and vehicle starter solenoid 253 is not energized, preventing the engine from starting. To reinitiate the vehicle engine function, the cover 32 and diaphragm 36 with its control magnets 134 are removed from the housing 30. Additional brake fluid is then added to the reservoirs 56, 58 at this time, returning the level of fluid to the proper line and the diaphragm 36 and control magnets 134 to their initial normal positions.

A similar circuit 260 for the single unit master cylinder device 160 is illustrated in FIG. 6, again comprising the battery 242, the ignition switch 244, the brake signal light 246, a single reed switch 100 and its biasing magnet 108, a control magnet 134, a control relay 250 in series with the reed switch 100a, and optionally the secondary circuit 247.

It will be recognized that the brake signal lamp 246 and the differential switch 248, currently installed in automobiles and similar motor vehicles, are made use of and connected in the signalling circuit of the inventive system herein disclosed. Energized by the automobile battery 242, when the ignition switch 244 is closed, the brake signal lamp 246 will light up when a predetermined aunt of brake fluid BF leaks out of the brake system. A loss of brake fluid, at the present time, is not signalled until the fluid is substantially exhausted from the master brake cylinder. At that point, of course, the vehicle operator has lost braking power substantially altogether. He can no longer control deceleration of his vehicle, and the effective purpose to which the brake signal light is directed has now been achieved, but too late.

The operation of the inventive device and system herein-disclosed proceeds on the premise and to the end that the vehicle operator is given early and advance warning of either a predetermined appreciable loss of brake fluid through leakage and/or a substantial reduction and wear of the brake lining on the brake shoes or disc pads, the latter condition requiring substantially more brake fluid to advance the brakes to engagement and braking effect. The reservoirs 56, 58 and 166 of the master cylinders 14 and 160 respectively are normally filled with brake fluid to about the line $L_1$ shown in FIGS. 2 and 5 immediately below the diaphragm 36 and 170 respectively, so that the body of each diaphragm lies and rests directly upon the brake fluid at that level. The control magnets 134 rest in their respective wells or cavities, as illustrated, with their poles so arranged that they are in repelling attitude to like poles of the biasing magnets 108 and 108a and the switch contacts 107 in the reed switches 100 and 100a immediately thereabove. In such attitude, the normally biased closed reed switches are biased open by the greater magnetic influence of the control magnets 134. The control magnets 134 hold switches 100 open, breaking the circuits 240, or 260, so that the brake signal light 246 cannot be energized. When the brake pedal 10 is applied and the push rod or link 12 connected to the piston 42 or 184 moves it forwardly in the brake cylinder 38 or 164, respectively, brake fluid in these cylinders is forced through the conduits 18 and 24 to the brake cylinders 20 and 26 causing the brake shoes 22 and 28 respectively to move outwardly and effect a braking and deceleration action or effect upon the vehicle.

When the brake fluid is at the relatively high level $L_1$ indicated immediately under the diaphragm 36 in solid line, and there is no leakage in the brake lines, only a relatively small amount of brake fluid is displaced from the reservoirs into the brake lines, the same being true when the brake linings on the brake shoes and/or the disc pad faces are substantially thick and adequate for substantial braking action. Under the action of the brake pedal, the master cylinder piston or pistons force brake fluid into the lines 18 and 24, reducing the fluid level in the reservoirs. This function tends to create a vacuum under the diaphragm, allowing atmospheric pressure to force the diaphragm to bear directly upon the brake fluid. But when brake fluid leaks out of the hydraulic brake system or lines at any point and is materially reduced in the master cylinder reservoirs, as indicated by the broken line $L_2$ shown in those reservoirs, the body of the diaphragm will assume a much lower position and in such attitude the control magnets 134 will be materially displaced from their initial position of magnetic influence upon the reed switch contact 107 so that the biasing effect of the magnet 108, now in the weaker field area of the control magnet 134, influences the switch contacts 107 and 109 to closed position, making the circuit to the lamp 246. When such level $L_2$ of brake fluid develops, and the repelling force of the control magnet is no longer sufficient to bias the reed switch open and its switch contacts close making the circuit to lamp 246, the vehicle operator is immediately warned that the brake fluid level is reduced to a point where brake failure may and should be anticipated. The brake signal lamp 246 comes on and remains on, because there is no way to return the control magnet 134 to its original elevated position unless the cover 32 is removed to equalize the pressure under and above the diaphragm 36. Thus, when the brake fluid level has been materially lowered by leakage from the brake lines or by very substantial reduction in brake lining thickness, it can then be expected that the brake signal lamp 246 will be continually energized because the diaphragm 36 or 170, under atmospheric pressure admitted through the covers, rests upon a level of brake fluid at which the control magnet 134 no longer has sufficient magnetic influence upon the reed switch contacts 107 and 109 to hold them open. When that level is reached, if the third switch 100a is connected in the circuit, it will be held closed by the biasing magnet 108a which energizes the control relay 250, opening the secondary circuit control contact 251 to the starter solenoid 249, so that the motor vehicle engine cannot be restarted. The reed switch 100a and control relay 250, together with the secondary circuit 247, when added to the system, provides additional safety and security.

The control and biasing magnets should be selected for their relative magnetic field effects, with magnetic values such that, when the control magnet 134 is disposed in the reservoir with the brake fluid level substantially at line $L_1$, its force field upon the switch contacts 107 and 109 will maintain these contacts open against the biasing influence or field effect of the biasing magnet 108. These relative values of the two magnets should also permit a loss in the field effect of the control magnet 134 when the brake fluid level in the reservoir is substantially at a predetermined lower line, such as $L_2$, whereat the magnetic field effect of the biasing magnet 108 overcomes the now reduced field effect of the control magnet 134 to bias the switch contacts 107 and 109 to circuit closing position. These magnetic field values can be provided by selectively engineering the relative sizes and configurations of the control and biasing magnets. Such specifications are readily determined by persons skilled in the art relating to such magnets and switch devices.

By these means, a system has been provided for early warning to the motor vehicle operator of a brake fluid condition indicating that brake failure will occur and should be anticipated unless brake fluid and/or brake linings and facings are replaced. The advantages of such a device and system are obvious and necessary to the proper operation of a motor vehicle and the safety and protection of the operator and passengers riding therein.

Although particular preferred forms or embodiments of the invention have been disclosed herein for purposes of explanation, further modifications or variations thereof, after study of this specification, will or may become apparent to those skilled in the art to which the invention pertains. Reference should be had to the appended claims in determining the scope of the invention.

We claim:

1. A liquid level indicating device in a hydraulically operated vehicle brake system comprising in combination
   a master brake cylinder housing having a brake fluid reservoir,
   a removable cover for said housing overlying and forming a chamber above said reservoir,
   means removably securing said cover to said housing, means in said cover to admit air at atmospheric pressure to said chamber,
   a control magnet and support means for said control magnet disposed upon the brake fluid in said reservoir so that said control magnet falls and rises with the level of said brake fluid,
   electrically-powered magnetically-responsive normally closed switch means secured to said cover in said chamber in the field of magnetic influence of said control magnet maintaining said switch means open,
   and an electric circuit embodying a signalling device connected and responsive to said switch means,
   whereby when said control magnet falls to a level at which its magnetic influence no longer maintains said switch means open, said circuit is closed energizing said signalling device.

2. The device defined in claim 1, wherein said control magnet support means comprises
   a flexible resilient diaphragm secured by and between said cover and the peripheral edge of said housing about said reservoir,
   a portion of said diaphragm being adapted to rest and ride upon said brake fluid in said reservoir.

3. The device defined in claim 2 wherein said diaphragm portion is provided with a recess, said control magnet being seated in said recess.

4. The device defined in claim 3, wherein said control magnet is adhesively secured to said diaphragm in said recess.

5. The device defined in claim 1, wherein said control magnet support means comprises
   a float adapted to rest and ride upon said brake fluid in said reservoir,
   said control magnet resting upon said float.

6. The device defined in claim 5, wherein said control magnet is adhesively secured to said float.

7. The device defined in claim 1, wherein said master brake cylinder housing is provided with a plurality of brake fluid reservoirs,
said control magnet and its support means being disposed upon the brake fluid in each said reservoir,
said switch means being secured to said cover in the field of magnetic influence of each said control magnet.

8. The device defined in claim 1, wherein said switch means comprises a magnetically actuated reed switch.

9. The device defined in claim 8, wherein said reed switch is provided with a magnet biasing said switch to circuit closing position.

10. The device defined in claim 9, wherein said control magnet and said biasing magnet have like poles in juxtaposed relationship,
    the influence of said control magnet overcoming the influence of said biasing magnet upon said reed switch to maintain said reed switch in circuit opening position.

11. The device defined in claim 1, wherein said electric circuit comprises
    a source of electric power,
    a vehicle ignition switch,
    a normally open reed switch having a magnet biasing said reed switch to circuit closing position,
    said signalling device,
    and said control magnet,
    said control magnet having a magnetic influence upon said reed switch of a magnitude sufficient to overcome the influence of said biasing magnet so as to open said reed switch and maintain the same in open position to a predetermined lower level of said brake fluid.

12. The device defined in claim 11, wherein said electric circuit further includes a control reed switch and a control relay in series, to continuously energize said signalling device when said control reed switch is closed.

13. The device define in claim 12, wherein said reed switch and control reed switch are secured to said cover in the field of influence of said control magnet.

14. The device defined in claim 1, wherein said signalling device comprises a signal lamp.

15. The device defined in claim 1, wherein said control magnet is provided with an effective magnetic influence upon said switch means directly related to a predetermined level of brake fluid in said reservoir at which said signalling device is to be energized.

16. The device defined in claim 1, wherein said control magnet is spaced apart from and free of direct connection to said switch means,
    said switch means being responsive to the field of influence produced by said control magnet.

17. The device defined in claim 9, wherein said control magnet is spaced apart from and free of direct connection to said reed switch,
    said reed switch being responsive to the fields of influence produced by said control magnet and said biasing magnet.

18. The device defined in claim 1, wherein said control magnet support means comprises
a pneumatic float device having a central body portion upon which said control magnet is disposed.

19. A brake fluid level indicating system for a hydraulically operated vehicle brake system comprising in combination
a master brake cylinder device comprising a housing having a brake fluid reservoir,
a removable cover for said housing overlying and forming a chamber above said reservoir,
means removably securing said cover to said housing, means in said cover to admit air at atmospheric pressure to said chamber,
a control magnet and support means for said control magnet disposed upon the brake fluid in said reservoir so that said control magnet falls and rises with the level of said brake fluid,
electrically-powered magnetically-responsive normally closed switch means secured to said cover in said chamber in the field of magnetic influence of said control magnet maintaining said switch means open,
and an electric circuit embodying a signalling device connected and responsive to said switch means,
whereby when said control magnet falls to a level at which its magnetic influence no longer maintains said switch means open, said circuit is closed energizing said signalling device.

20. The system defined in claim 19, wherein
said electric circuit comprises
a source of electric power,
a vehicle ignition switch,
a normally open reed switch having a magnet biasing said reed switch to circuit closing position,
said signalling device,
and said control magnet,
said control magnet having a magnetic influence upon said reed switch of a magnitude sufficient to overcome the influence of said biasing magnet so as to open said reed switch and maintain the same in open position to a predetermined lower level of said brake fluid, 21. The system defined in claim 19, and including
second switch means an a control relay in series operatively connected in said electric circuit to maintain said circuit closed at said predetermined level of brake fluid in said reservoir,
said second switch means being secured in said cover and magnetically responsive to said influence of said control magnet.

22. The system defined in claim 21, and including
a secondary circuit operatively connected to said electric circuit and comprising in series
a starter switch operatively linked to said vehicle ignition switch,
normally closed control relay contacts, and a vehicle starter solenoid,
whereby when said control relay is energized, the circuit to said starter solenoid is opened, leaving said starter switch inoperative.

23. The device defined in claim 1, wherein
said master brake cylinder housing is provided with a pair of brake fluid reservoirs separated by a partition wall therebetween,
a passageway in said partition wall to permit flow of brake fluid from one reservoir to the other,
said control magnet and its support means being disposed upon the brake fluid in one said reservoir,
and said switch means being secured to said cover in the area over said one reservoir and in the field of magnetic influence of said control magnet.

24. The device defined in claim 1, wherein
said master brake cylinder housing is provided with a pair of brake fluid reservoirs separated by a partition wall therebetween,
a brake fluid equalizing siphon tube disposed upon the upper edge of said partition wall and having a depending portion extending into each said reservoir to receive and transfer brake fluid from one reservoir to the other,
said control magnet and its support means being disposed upon the brake fluid in one said reservoir,
and said switch means being secured to said cover in the area over said one reservoir and in the field of magnetic influence of said control magnet.

* * * * *